(12) United States Patent
Wang

(10) Patent No.: US 6,522,749 B2
(45) Date of Patent: *Feb. 18, 2003

(54) QUANTUM CRYPTOGRAPHIC COMMUNICATION CHANNEL BASED ON QUANTUM COHERENCE

(75) Inventor: Lijun Wang, Lawrenceville, NJ (US)

(73) Assignee: NEC Laboratories America, Inc., Princeton, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/234,765

(22) Filed: Jan. 21, 1999

(65) Prior Publication Data

US 2003/0002670 A1 Jan. 2, 2003

(51) Int. Cl.[7] .............................. H04L 9/00; H04L 9/26
(52) U.S. Cl. ....................... 380/263; 380/265; 380/54; 380/52
(58) Field of Search .................................... 380/52, 54

(56) References Cited

U.S. PATENT DOCUMENTS

| | | | | |
|---|---|---|---|---|
| 5,307,410 A | * | 4/1994 | Bennet | 380/54 |
| 5,311,592 A | * | 5/1994 | Udd | 380/54 |
| 5,515,438 A | * | 5/1996 | Bennet et al. | 380/21 |
| 5,694,114 A | * | 12/1997 | Udd | 380/54 |
| 5,764,765 A | * | 6/1998 | Phoenix et al. | 380/21 |
| 5,768,378 A | * | 6/1998 | Townsend et al. | 380/21 |
| 5,966,224 A | * | 10/1999 | Hughes et al. | 380/54 |
| 5,974,150 A | * | 10/1999 | Kaish et al. | 380/54 |
| 6,028,935 A | * | 2/2000 | Rarity et al. | 380/21 |
| 6,314,189 B1 | * | 11/2001 | Motoyoshi et al. | 713/150 |

OTHER PUBLICATIONS

L.J.Wang and J.K.Rhee;Propagation of transient quantum coherence;1998;The american physical society;;vol. 59. No. 2.*
X.Y.Zou,L.J.Wang, and L.Mandel;Induced Coherence and Indistinguishability in Optical Interference;1991;The APS;V67. No. 3.*
L.J. Wang, et al., "Propagation of Transient Quantum Coherence", 1999 The American Physical Society, Physical Review A, vol. 59, No. 2, Feb. 1999, pp. 1–4.
X.Y. Zou, et al., "Induced Coherence and Indistinguishability in Optical Interference", 1991 The American Physical Society, Physical Review Letters, vol. 67, No. 3, Jul. 1991, pp. 318–321.

* cited by examiner

*Primary Examiner*—Gilberto Barrón
(74) *Attorney, Agent, or Firm*—Scully, Scott, Murphy & Presser

(57) ABSTRACT

A quantum cryptographic communication channel having: a light source; a reflector; first and second sources each capable of generating a pair of photons emitted in the form of signal and idler light beams when energized by the light source, the first and second sources being arranged relative to each other such that the idler beam from the first source is incident upon the second source and aligned into the idler beam of the second source and the signal beams are directed by the reflector to converge upon a common point; a light modulator for changing the phase of the idler beam from the first source between first and second phase settings before being incident upon the second source; a controller for controlling the timing of the phase change from the first phase setting to the second phase setting; first and second detectors for detecting the incidence of the signal beams from the first and second sources; and a beam splitter disposed at the common point for directing the signal beams to the first detector when the phase of the idler beam from the first source has the first phase setting and to the second detector when the phase of the idler beam from the first source has the second phase setting.

6 Claims, 2 Drawing Sheets

QUANTUM CRYPTOGRAPHIC COMMUNICATION CHANNEL BASED ON QUANTUM COHERENCE

BACKGROUND OF THE INVENTION

1. Field of the Invention

The field of art to which this invention relates is cryptographic communication. Specifically, this invention provides a method based on physical principles for secretly distributing two sets of binary encryption keys that can be used to encrypt publicly transmitted messages between two parties.

2. Description of the Related Art

In general, to establish a secret channel between two parties and two parties only, there are three possible solutions. The first method is to use a secret courier who can deliver the message with secrecy. The second method involves the case, that is referred to as the "Public Key." In this case party A and party B publicly establish a mutual agreement over two prime numbers p and q. Party A then chooses a secret number x and publicly transmits a public number $p^x$ (mod q) to party B. Similarly, party B chooses a secret number y and transmits a number $p^y$ (mod q) to A. Party A then computes the number $(p^y)^x = p^{x \cdot y}$ (mod q) and Party B computes the number $(p^x)^y = p^{x \cdot y}$ (mod q). Using this method, a mutually identical key can be established. The secrecy in this method is guaranteed only by the assumption that a third party does not possess the computing power to factorize the numbers. Both the first and second methods are well known in the art.

The third method is often referred to as "Quantum Cryptography." The basic principle of operation for "Quantum Cryptography" can be summarized as follows. Sender A prepares a twin-particle quantum mechanical state. Such a state consists of two and only two quantum mechanical particles (x and y) (e.g., photons). The state is prepared in such a way that they fall into the general class of "Entangled Quantum States." Such a state possesses the property that the behavior of particle X is closely related to that of particle y. For example, if one prepares such a state and measures whether photon x is left or right-hand polarized. The result is closely related to the result if one were to perform a simultaneous measurement of such properties on particle y. In a special case (referred to as the Einstein-Podolsky-Rosen (EPR) state), the handiness of the polarization of the particles x and y are always opposite.

After preparing the entangled two-particle quantum state, the sender (A) sends one particle (x) through a channel to a receiver (B). The receiver at the right moment after receiving the particle (x), decides to rotate its polarization by 90° (denoting a binary "1") or do nothing (denoting a binary "0") and send the particle (x) back to the original sender (A). Upon receiving the particle (x) back from B, the original sender (A) can perform two identical measurements on both particles x and y, using a variety of polarization bases. If the outcome of the two measurements are the same for both particles (x and y), the sender (A) can conclude that the receiver (B) replied to the sender (A) a binary number "0". If the outcome of the two measurements are rotated by 90°, then a binary number "1" is registered. Since there is only one quantum x (e.g., a photon) that is sent at a time when one bit of a secret key string is communicated, if the photon (x) is captured or tampered with by an eavesdropper (C), the polarization properties of the photon will be lost. Hence the method is safe from eavesdropping.

Prior art schemes which utilize Quantum Cryptography use laser sources instead of a single photon pair source, and therefore cannot be considered a true quantum cryptographic communication channel. While these schemes have their advantages, they are plagued by the following disadvantages:

1. The prior art schemes do not provide a secret communication channel between two and only two parties by using a single photon to carry the binary key string information, hence, they do not preserve secrecy based on physical principles;
2. The prior art uses a single particle's polarization entanglement state which requires one of the two entangled particles to travel through the distance between the two communicating parties twice, during this long distance, any disturbance to the pathway channel (i.e., thermally or mechanically induced birefringence) obstructs the polarization of the communication channel and introduces error;
3. The prior art uses a single particle's polarization entanglement state which is prone to naturally occurring birefringence, which can also obstruct the communication channel and introduce error; and
4. The prior art uses a phase modulation for communication which is required to be preserved for twice the long communication pathway length which is particularly prone to external disturbance (i.e., thermal or acoustic disturbances that are fast enough to cause an inhomogeneous change to the pathway (fiber channel) length during the entire communication period), again this affects the communication channel and introduces error.

SUMMARY OF THE INVENTION

The present invention resolves all of the above problems by communicating through a conventional pathway channel using the quantum coherence properties between two single photon sources, and in particular is based upon the physical principle that the quantum mechanical state of a single quantum, if unknown, cannot be copied.

Accordingly, a quantum cryptographic communication channel is provided. The quantum cryptographic communication channel comprises: a light source; directing means; first and second sources each capable of generating a pair of photons emitted in the form of signal and idler light beams when energized by the light source, the first and second sources being arranged relative to each other such that the idler beam from the first source is incident upon the second source and aligned into the idler beam of the second source and the signal beams are directed by the directing means to converge upon a common point; a light modulator for changing the phase of the idler beam from the first source between first and second phase settings before being incident upon the second source; a controller for controlling the timing of the phase change from the first phase setting to the second phase setting; first and second detectors for detecting the incidence of the signal beams from the first and second sources; and a beam splitter disposed at the common point for directing the signal beams to the first detector when the phase of the idler beam from the first source has the first phase setting and to the second detector when the phase of the idler beam from the first source has the second phase setting.

In a preferred embodiment of the present invention, the detection of the signal beams at the first detector corresponds to a first logical value and the detection of the signal beams at the second detector corresponds to a second logical value wherein the controller controls the timing of the phase change from the first phase setting to the second phase setting corresponding to the first and second logical values, respectively, to thereby transmit a cryptographic key string comprising a plurality of the first and second logical values.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Figure 1:
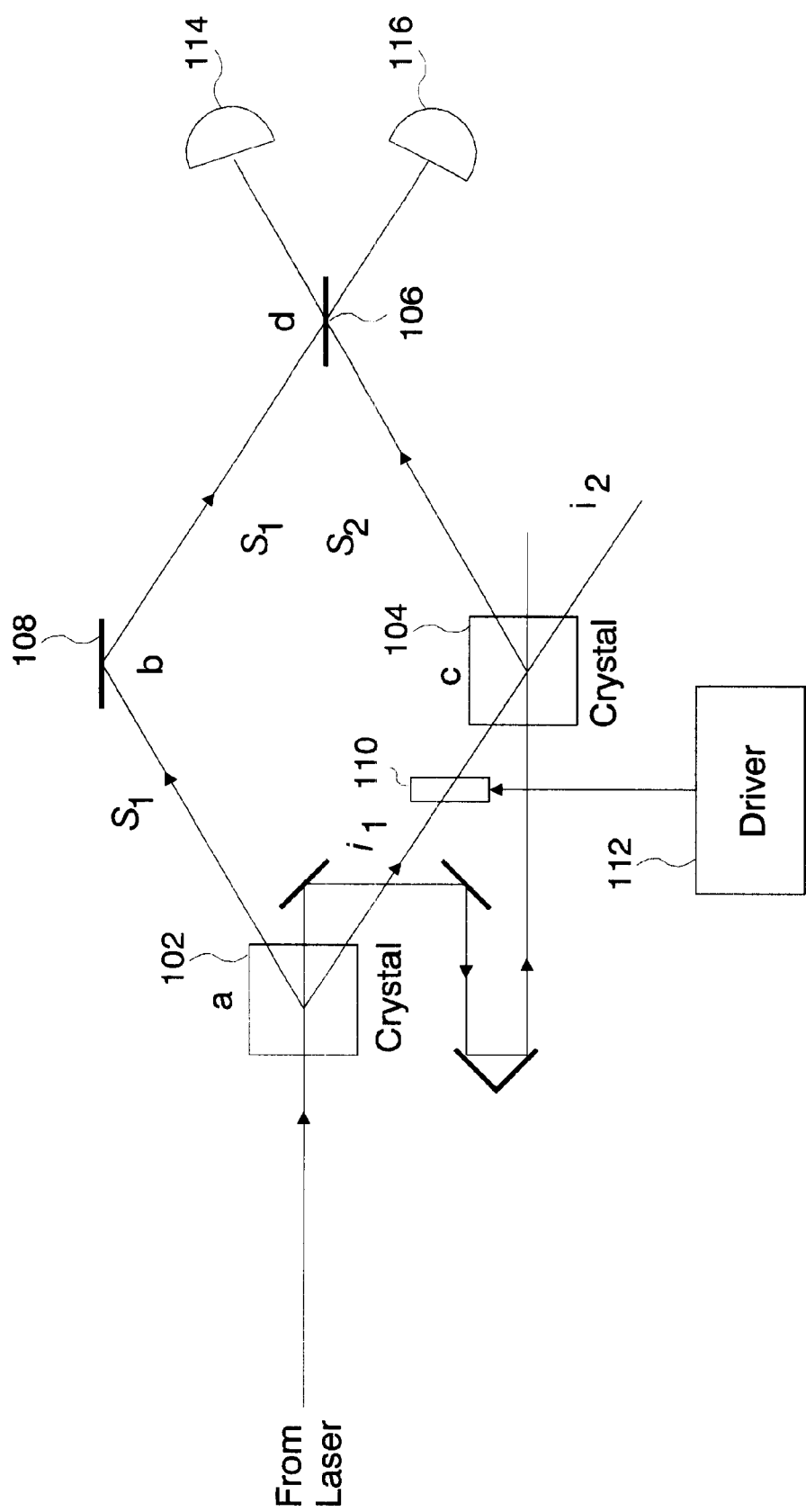
FIG. 1 illustrates a schematic overview of a system of the present invention in which there is an induced coherence without an induced emission effect.

Before discussing the preferred implementation of the present invention in detail, a general overview of the physical principles behind the present invention will be discussed with reference to FIG. 1. FIG. 1 illustrates a single photon originating from each one of first and second sources 102, 104. Both sources 102, 104 are second order non-linear crystals that are operated as "parametric down-converters" and generate a pair of photons that are emitted simultaneously in the form of light beams called "signal" and "idler" beams, designated s and i, respectively, i1 and s1 being the idler and signal beams from the first source 102 and i2 and s2 being the idler and signal beams from the second source 104. Second order non-linear crystals, their operation modes as parametric down-converters, and signal and idler beams are well known in the art and therefore a detailed description of them is omitted in the interests of brevity. When the system settings are adjusted such that either the first source is emitting a pair of photons (s1 and i1) or the second source is emitting a pair of photons (s2 and i2), a special situation occurs under the special arrangement illustrated in FIG. 1. When the path lengths of all the beams (s1, i1, s2, i2) are well adjusted and the first and second idler beams (i1, i2) are aligned into each other, the first and second signal beam (s1, s2) photons upon entering a beam splitter (BS) 106 will exit from the same side. When the signal beam path length is adjusted to be different by half of the wavelength (a 180° phase shift) of the signal beam (s1, s2) photons, all of the signal beam (s1, s2) photons upon arriving at the BS 106 will exit from the opposite side of the BS 106. Furthermore, a 180° phase shift introduced to the first idler beam (i1) between the two sources 102, 104 has the identical effect of switching the signal beams (s1, s2) into the opposite sides of the BS 106.

In other words, the first and second identical nonlinear crystal sources 102, 104 are optically pumped by two strong pulsed pump waves, preferably from a single laser source (not shown). When the phase matching conditions are met, down-conversion occurs either at the first source 102 with the simultaneous emission of the first signal beam (s1) and idler beam (i1) photons, or at the second source 104 with the emission of the second signal beam (s2) and idler beam (i2) photons at a time later. The first idler beam (i1) is aligned through the second source 104 and into the second idler beam (i2) mode with a path length $c\tau_i$ between the first and second sources 102, 104, where c=speed of light, and $\tau_i$=optical delay between the first and second sources 102, 104. The first signal beam (s1) from the first source 102 is reflected to the BS 106 located at a common point at which the first and second signal beams (s1, s2) intersect by mirror 108. The first and second signal beams (s1, s2) are combined at the BS 106 with the two optical paths of abd and cd of lengths $c\tau_{s1}$ and $c\tau_{s2}$, respectively. A light modulator 110 is inserted into the first idler beam (i1) path to control its phase setting between first and second phase settings, preferably, of between a 180° or a 0° phase shift as controlled by driver 112. However, it is understood by one of ordinary skill in the art, that the light modulator could alternatively be in the path of one of the signal beams (s1, s2). When the optical paths are balanced, namely, when $\tau_{s1}-\tau_{s2}=\tau_i$ to within the coherence lengths of the first and second signal beam (s1, s2) and first and second idler beam (i1, i2) photons, interference effect occurs.

The interference effect is well known in the art, thus we only emphasize two key features for brevity. The first is that by controlling the phase of the communication channel one can control the probabilities for all the photons to exit from one port (or side) or an opposite port of the beam splitter 106 in a deterministic fashion. The other key feature is if any part of the communication channel pathways, i.e., paths following beams s1, s2, and i1, are tampered with in any fashion, the photons arriving at the beam splitter 106 will exit randomly.

Moreover, when the path lengths are well adjusted, the interference effect switches the first and second signal beam (s1, s2) photons to both arrive at a first detector 114 when there is a 180° phase shift and to a second detector 116 when there is a 0° phase shift. Thus, the beam splitter 106 directs the signal beams (s1, s2) to the first detector 114 when the phase of the first idler beam (i1) has a 180° phase shift and to the second detector 116 when the phase of the first idler beam (i1) has a 0° phase shift.

By controlling the phase of the apparatus illustrated in FIG. 1, the direction of the first and second signal beam (s1, s2) photons, from the BS 106 can be controlled. This special behavior is valid only under the condition that all three light pathways, namely, the first and second signal beams (s1, s2) and the first idler beam (i1) are open and not disturbed externally. Any external disturbance (eavesdropping) will obscure the certainty in the signal photon's directionality. Therefore, by periodically testing whether the first and second signal beam (s1, s2) photons can be directed with high certainty, the communication channel can be tested to determine if it has been compromised.

Figure 2:
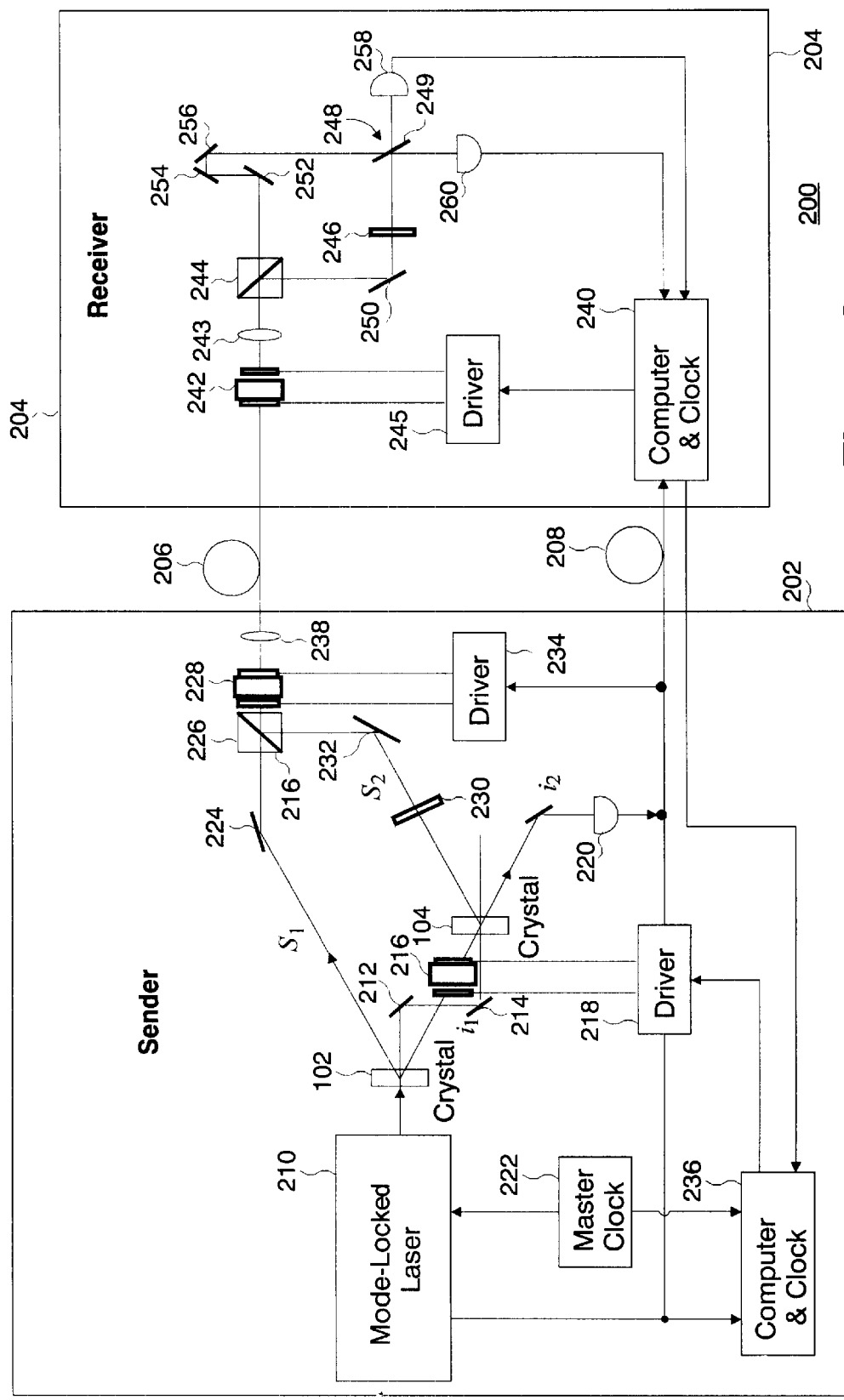
FIG. 2 illustrates a schematic view of a sender and receiver cryptographic communication channel of the present invention.

Referring now to FIG. 2, the preferred implementation of the present invention is illustrated and referred to generally by reference numeral 200, wherein like elements to FIG. 1 are referred to with like reference numerals. The system has a "sender" side 202 and a "receiver" side 204. However, it should be appreciated by someone skilled in the art that each "side" can have both a receiver and a sender such that the signal beams (s1, s2) can be either transmitted or received. The sender side 202 consists primarily of an apparatus to produce the coherently superposed quantum state for a single photon. The receiver side 204 consists primarily of an analyzer apparatus. The sender 202 and the receiver 204 are linked via a fiber optical channel 206 for the cryptographic key transmission and a public channel (an insecure data line) 208 for the purpose of verifications.

Sender Side

A light source 210, preferably a mode-locked laser produces a short-wavelength laser pulse train that is used to pump the first and second second-order nonlinear crystal sources 102, 104. Preferably the laser is directly incident on one of the crystal sources 102 and is reflected onto the other crystal source 104 by way of a mirroring arrangement, such as by mirrors 212 and 214 as shown in FIG. 2. However, any arrangement to provide the laser beam onto both sources 102, 104 can be used without departing from the scope or spirit of the invention.

By choosing the appropriate phase-matching conditions, each of the first and second sources 102, 104 can produce a pair of down-converted signal beam (s1, s2) and idler beam (i1, i2) photons. The first idler beam (i1) from the first source 102 is aligned into the same mode of propagation as the second idler beam (i2) from the second source 104. A first light modulator 216 driven by a voltage-control module 218 is inserted into the first idler beam(i1). The combined idler beam mode of propagation (i1 and i2) is aligned into an idler beam single-photon detector 220, such as a single-photon avalanche photo diode detector whose output is used as a condition signal for the encryption key string transmission. The first light modulator 216 is capable of producing either a 180° or a 0° phase shift depending on the control signal from a sender's computer 236 and is timed with a derived signal from a master clock 222 which is synchronized with the mode-locked laser 210. The first signal beam (s1) from the first source 102 is reflected from a mirror 224 and directed into a first polarized beam-splitter (PBS) 226 located at a first common point 227. Its polarization is so arranged that the first signal beam (s1) is always transmitted through the first PBS 226 into a second light modulator 228. The second signal beam (s2) from the second source 104 goes through a first half-wave plate ($\lambda/2$) 230 such that its polarization is rotated by 90° before being incident upon mirror 232, which directs the second signal beam (s2) to the first PBS 226. Hence, the second signal beam (s2) upon entering the first PBS 226 is always reflected into the same spatial mode of propagation as the first signal beam (s1) and also enters the second light modulator 228. The second light modulator 228 is controlled by a voltage driver 234 which can rotate the polarization of the first and second signal beams (s1, s2) at its entrance by 90° or by 0°. The rotation is controlled by a timing signal from the sender computer 236 that is synchronized with the master clock 222. Preferably, the clock signals are arranged in such a fashion that at the time when a first signal beam (s1) photon arrives at the second light modulator 228, its polarization is not rotated. Furthermore, if the arriving signal photon were a second signal beam (s2) photon, after it has already been rotated by the first half-wave plate ($\lambda/2$) 230 to enter the second PBS 226, its polarization is rotated by 90° by the second light modulator 228 and hence restored. Because the first and second signal beam (s1 and s2) photons are generated at different times, there exists a time window in which the necessary polarization rotation can be performed. Therefore, independent of where the signal beam (s1, s2) photon is coming from (source 102 or 104), only a time-delay will exist between the signal beam (s1, s2) photons; their polarization states will be the same. Upon exiting from the second light modulator 228, the single mode of propagation consisting of both the first and second signal beam (s1, s2) are focussed with a first lens 238 into the single mode fiber 206 for transmission to the receiver side 204. The master clock signal, after proper electronic re-shaping and proper delay adjustment is also sent to the receiver side 204 for synchronization via the data line 208. The master clock signal need only be sent to the receiver side once for initial synchronization; both the sender and receiver sides can control the transmission and reception via local clocks. An electronic flag signal indicating the successful detection of a first or second idler beam (i1, i2) photon is also sent to the receiver side 204 via the data line 208.

Receiver Side

The receiver side 204 is constructed with an analyzing apparatus. Upon receiving the single photon superposition states (s1, s2) through the fiber channel 206 and the timing signal through the data line 208, the receiver's computer clock 240 sends out a timed signal to a third light modulator 242 via a third driver 245.

Alternatively, the first and second controllers 218, 234 can be synchronized by the master clock 222 and the third controller 245 can be initially synchronized by the master clock 222 and thereafter synchronized by the receiver side clock 240. Thus, the master clock 222 and receiver side clock 240 are in a master/slave relationship.

The third light modulator 242 performs the following function. The clock signals are arranged in such a fashion that at the time when a first signal beam (s1) photon arrives at the third light modulator 242, its polarization is unaltered. A short time delay later, for an arriving second signal beam (s2) photon, its polarization is rotated by 90°. Therefore, a first signal beam (s1) photon will proceed to transmit through a second polarized beam-splitter (PBS) 244 and go into a well-adjusted delay. A second signal beam (s2) photon is reflected from the second PBS 244 and then through a second half-wave plate ($\lambda/2$) 246 and enters a lower arm of the receiver 204. Preferably, the first and second signal beams (s1, s2), before entering the second PBS 244 are collimated therein by a second lens system 243. The first and second signal beams (s1, s2) are directed to a second common point 248 at which a beam splitter (BS) 249 is disposed, preferably by a mirror arrangement, such as by mirrors 250, 252, 254, and 256, as illustrated in FIG. 2. With a proper time adjustment, the first and second signal beams (s1 and s2) interfere. Therefore, if the phase shift produced at the first light modulator 216 is set at 0°, all signal beam photons (either an s1 or an s2) will exit into one side of a beam splitter (BS) 249 and be detected by a first signal beam single-photon detector 258. Conversely, if the first light modulator 216 is set at phase 180°, all signal photons (either an s1 or an s2) will exit from the other side of the BS 249 and be detected by a second signal beam single-photon detector 260. By detecting whether the first or the second signal beam single-photon detectors 258, 260 have registered a photon, the receiver 204 can determine if the sender has sent a logical value of "1" or "0". A string of logical values, such as "1's" and "0's" in a binary system, comprises the encryption key string.

Error Detection and Correction

The sender 202 and the receiver 204 can actively lock the path length difference by using conventional locking techniques known in the art. In this way, the error due to the path length difference at both sender and receiver sides 202, 204 can be reduced. Furthermore, the sender 202 and the receiver 204 can detect errors in the signal beam (s1, s2) transmission and correct such errors by abandoning the failed transmission.

In the following, the conditions in which both parties (sender and receiver 202, 204) can rectify the key string communication results is discussed. First, the sender 202 uses the detection of the first and second idler beam (i1, i2) photons by the idler beam single-photon detector 220 as a condition for a successful communication. Only under the condition of a successful detection of a first and second idler beam (i1, i2) photon by the idler beam detector 220, the sender 202 sends a flag signal to the receiver 204 under which a detection by either of the first or second signal beam single-photon detectors 258 or 260 will be registered. Second, only under the condition when the receiver side 204 detects a first or second signal beam (s1, s2) photon by either the first or second signal beam single-photon detector 258, 260, a flag signal is sent back to the sender 202 via the conventional data line 208 to indicate the successful detection. Combined with the flag signal for the detection of a first or second idler beam (i1, i2) photon, the communication is marked successful.

Next, the key string transmission is compared and verified. At this step, the conditions of transmission between the sender and receiver 202, 204 are compared through a conventional channel. When there is a discrepancy, the necessary phase change is adjusted to ensure that the encryption key string transmission occurs at a higher successful rate. Furthermore, a testing procedure for the secret encryption key string transmission can be employed to test every bit of the encryption key string transmission. Using such a method, the successfully transmitted encryption key bits are identified and kept and the unsuccessful ones identified and abandoned. Finally, testing procedures can also be employed to test the entire communication channel and determine if an eavesdropper exists. Such a testing procedure preferably employs a scheme where the sender 202 prepares a quantum state (using an algorithm to generate an arbitrary phase sequence) and sends that state to the receiver 204. After a number of repetitions, the sender 202 and receiver 204 compare the results. If there is a discrepancy, one can conclude that the communication channel is compromised. Otherwise, the communication is secure.

One skilled in the art can appreciate that the communication of the present invention is one-way. Namely, the sender (202) selects a certain binary value for a specific bit in the key string and accordingly sets the phase value for the overall pathway to achieve that value. A testing procedure is preferably first run to ensure the phase relations between the sender side 202 and the receiver side 204 is identical. After which, the system is calibrated. In the present invention, since both the first and second signal beams (s1, s2) go through the same fiber pathway (fiber link 206), any external disturbance to the fiber 206 carrying the first and second signal beams (s1, s2) will not result in an overall phase relation change between the two signal beams because, in practice, the two signal beams are only separated by a few nanoseconds in time inside the fiber 206 to allow demultiplexing. Such a short time delay is far too short to be affected by any thermal, mechanical, or acoustic disturbances. Therefore, both the first and second signal beams (s1, s2) will experience the same effect due to any external disturbance to the fiber pathway 206 and hence their path length difference or the relative phase is preserved. Furthermore, as can be appreciated by one skilled in the art, the present invention does not rely on the preservation of the polarization of a quantum mechanical state which eliminates the aforementioned disadvantages of the prior art.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by letters patent is:

1. A quantum cryptographic communication channel based on quantum coherence, the quantum cryptographic communication channel comprising:
 (a) a sender system having:
  (i) a light source;
  (ii) a first directing means;
  (iii) first and second sources each capable of generating a pair of photons emitted in the form of signal and idler light beams when energized by the light source, the first and second sources being arranged relative to each other such that the idler beam from the first source is incident upon the second source and aligned into the idler beam of the second source and the signal beams are directed by the first directing means to converge upon a first common point;
  (iv) a phase modulator for changing the phase of one of the idler beam from the first source, signal beam from the first source, or signal beam from the second source between first and second phase settings, said first and second phase settings being separated by 180°; and
  (v) a fist controller for controlling the timing of the phase change from the first phase setting to the second phase setting;
 (b) a receiver system having:
  (i) a second directing means for directing the signal beams from the sender system to converge upon a second common point;
  (ii) first and second detectors for detecting the incidence of the signal beams from the first and second sources; and
  (iii) a beam splitter disposed at the second common point for directing the signal beams to the first detector when the phase is changed to the first phase setting and to the second detector when the phase is changed to the second phase setting; and
 (c) an optical link in optical communication with the second and third light modulators thereby optically connecting the sender system and the receiver system for transmission of the signal beams therebetween wherein the first directing means comprises:
  a half waveplate disposed in the optical path of the signal beam from the second source for shifting the phase of the signal beam from the second source by 90 degrees;
 first and second mirrors disposed in the optical paths of the signal beams from the fist and second sources, respectively for directing the signal beams from the first and second sources to the first common point;
 a first polarization beam splitter disposed at the first common point for transmitting the signal beam from the first source and reflecting the signal beam from the second source shifted by 90 degrees;
 a second light modulator disposed in the optical path between the first polarization beam splitter and the optical link, the second light modulator being controlled such that the phase of the signal beam from the first source is unaltered and the phase of the signal beam from second source is again shifted by 90 degrees to thereby restore its phase as it was before being shifted by the first half waveplate; and
 wherein the second directing means comprises:
  a third light modulator for accepting the signal beams from the fiber link, the third light modulator being controlled such that the phase of the signal beam from the first source is unaltered and the phase of th signal beam from second source is shifted by 90 degrees;

a second polarization beam splitter for transmitting the signal beam from the tint source and reflecting the signal beam from the second source as shifted by 90 degrees;

a second half waveplate disposed in the optical path of the signal beam from the second source before converging onto the second common point for shifting the phase of the signal beam from the second source by 90 degrees, to thereby restore its phase as it was before being shifted by the third light modulator; and third and fourth mirrors disposed in the optical paths of the signal beams from the first and second sources, respectively for directing the signal beams from the first and second sources to the second common point.

2. The quantum cryptographic communication channel of claim 1, further comprising a first lens for focusing the signal beams from the second light modulator into the optical link before being transmitted to the receiver system.

3. The quantum cryptographic communication channel of claim 1, further comprising a second lens for collimating the signal beams from the third light modulator into the second polarized beam splitter.

4. The quantum cryptographic communication channel of claim 1, further comprising second and third controllers for controlling the timing of the second and third light modulators.

5. The quantum cryptographic communication channel of claim 4, wherein the first, second, and third controllers are synchronized by a master clock, signals from which are carried by a data line connecting the sender system to the receiver system.

6. The quantum cryptographic communication channel of claim 4, wherein the sender system fin has a first clock synchronized to the light source and the receiver system has a second clock, whereby the first and second controllers are synchronized by the first clock, the third controller is initially synchronized by the first clock the signals from which are carried by a data line connecting the sender system to the receiver system, and the third controller is thereafter synchronized by the second clock.

* * * * *